Feb. 27, 1968

D. SILVERMAN 3,371,310

DISCRIMINATING BETWEEN PRIMARY AND
MULTIPLE SEISMIC REFLECTIONS

Filed March 14, 1966

DANIEL SILVERMAN
INVENTOR.

BY *Newell Pottorf*

ATTORNEY

DANIEL SILVERMAN
INVENTOR.

BY Newell Pottoff
ATTORNEY

Feb. 27, 1968   D. SILVERMAN   3,371,310
DISCRIMINATING BETWEEN PRIMARY AND
MULTIPLE SEISMIC REFLECTIONS
Filed March 14, 1966   3 Sheets-Sheet 3

DANIEL SILVERMAN
INVENTOR.

BY Newell Potter

ATTORNEY

United States Patent Office 3,371,310
Patented Feb. 27, 1968

3,371,310
DISCRIMINATING BETWEEN PRIMARY AND
MULTIPLE SEISMIC REFLECTIONS
Daniel Silverman, Tulsa, Okla., assignor to Pan American Petroleum Corporation, Tulsa, Okla., a corporation of Delaware
Filed Mar. 14, 1966, Ser. No. 534,047
12 Claims. (Cl. 340—15.5)

ABSTRACT OF THE DISCLOSURE

In distinguishing primary and multiple seismic reflections, seismic waves are generated near or below the ground surface, and two traces of the resulting seismic waves, corresponding respectively to the up- and the down-going waves passing a vertical spread or directional detector in a borehole and below the generator and near-surface down-reflecting interfaces, are convolved after removing first breaks. The resulting convolution trace shows events at the times of multiple, but not primary, reflections, and may therefore be used to identify or cancel the multiples in the trace corresponding to up-traveling waves.

---

This invention relates to seismic geophysical surveying and is directed particularly to the discrimination of primary and multiple seismic reflections. More particularly, it is directed to a method for obtaining and processing seismic data so as to identify, reduce, or eliminate certain undesirable seismic multiple reflections, while leaving desired primary seismic reflections substantially undisturbed.

In geophysical surveying by the seismic reflection method, multiple reflections have long been recognized as a major source of interference and errors in interpreting the seismic data. A number of field-operating and data-analysis or interpretation procedures have been applied to identify, reduce, or eliminate these multiple reflections. These procedures have had only limited success, however, despite the fact that considerable time and effort have been expended in obtaining overlapping or multifold field data or in performing complex analysis and interpretation procedures. No single approach to the problem has been found successful in solving it for all cases.

The present invention is based on the fact that the generation of both primary and multiple seismic reflections can be regarded as convolution processes. This is fully explained in U.S. Patent 3,131,375 of R. J. Watson, and also by a technical publication by R. J. Watson in Geophysics, volume 30, No. 1, February 1965, pages 54 to 72. Accordingly, Watson utilizes a process including convolution steps to achieve a substantial cancellation of the multiples. As is clearly explained both in the patent and in the technical publication, however, that process is considered applicable only to multiples produced by downward reflection from the ground surface or from the base of the weathering. Furthermore, some uncertainty arises in making a proper choice of the surface reflection coefficient, the filtering effect of near-surface layers, and the shallow interfaces that are chiefly responsible for producing the strong multiples.

In view of the foregoing it is a primary object of my invention to provide a novel and improved method of discriminating between primary reflections and those seismic reflections involving down-reflection by subsurface interfaces as well as by the ground surface and wherein a convolution step is utilized. A further object of the invention is to provide a method of discriminating primary and multiple seismic reflections by a combination of field-recording and subsequent record-interpretation procedures that, by automatically taking such factors into account, avoids any requirements for estimating reflection coefficients and filtering effects of the ground surface, near-surface layers or subsurface interfaces. A still further object is to provide a novel and improved method of discriminating primary and multiple seismic reflections which avoids the expensive multifold coverage of prior-art procedures, and which is independent of any type of near-surface layering and sub-surface velocity distribution. Other and further objects, uses, and advantages of the invention will become apparent as the description proceeds.

Briefly stated, the foregoing and other objects of the invention are accomplished by placing in the earth below a plurality of down-reflecting interfaces, including, for example, the ground surface and the weathering base as well as any additional near-surface strongly reflecting interfaces, a directional seismic-wave detector sensitive to vertical wave travel, preferably in the form of a vertical spread of seismometers or hydrophones. Seismic waves are then created in the earth at a location generally above the directional detector, such as at or immediately below the ground surface, by any desired means such as by the detonation of an explosive charge. The resulting vertically traveling seismic waves received by the subsurface detector, are phonographically recorded. By utilizing the directional properties of the receiver, the reproduced received waves are separated into two component wave functions respectively representing the up-traveling and the down-traveling seismic waves passing the receiver.

Of the down-traveling waves, only the first direct-wave arrival is responsible for producing primary reflections. After the first direct-wave arrival, all of the down-traveling energy passing the detector represents the energy that subsequently produces the multiple reflections which are to be discriminated against.

Considering the up-traveling energy passing the receiver, it represents, at least in its beginning portions, the primary reflections which result from convolution of the downgoing direct wave with the earth's primary reflectivity function. As it is precisely this reflectivity operator or function, convolved with that portion of the downgoing energy following the initial direct waves, that produces the undesired multiple reflections, this fact can be utilized to produce a trace containing essentially only multiple reflections, which trace can then be used to discriminate them from the primaries.

In other words, upon mathematically convolving a downgoing-wave trace, modified by omitting the direct wave, with an upcoming-wave trace, the resulting convolution function contains events at the times of multiple reflections but not at the times of primary reflections, as this mathematical process approximates the physical process in the earth which gives rise to the multiple reflections. A comparison between the trace of upcoming waves and the convolution trace then reveals the multiple reflections by their time coincidence in the compared traces; or alternatively, subtraction of the compared traces with the proper relative amplitudes results in substantial reduction or nearly complete elimination of the multiple reflections. Conversely, primary reflections can be recognized due to the fact that they are not reduced or cancelled, their amplitude remaining substantially constant.

This will be better understood by reference to the accompanying drawings forming a part of this application and illustrating certain typical and preferred embodiments of the invention. In these drawings.

Figure 1:
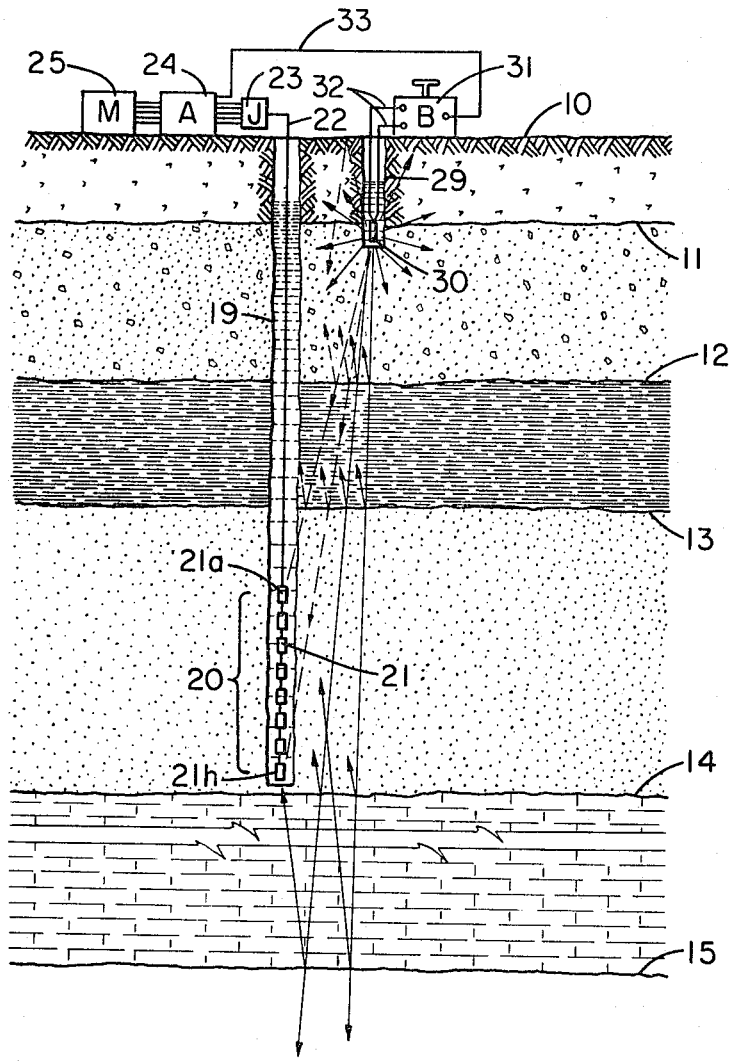
FIGURE 1 shows diagrammatically an earth cross-section, with apparatus in position for recording data utilized in applying the invention.

Referring now to the drawings in detail and particularly to FIGURE 1 thereof, this figure shows diagrammatically a cross-section of the earth, including the ground surface 10 and subsurface reflecting interfaces 11, 12, 13, 14 and 15. In addition to the ground surface 10, the interface 11, which may be the base of the weathered layer, and the interfaces 12 and 13 are considered likely to reflect seismic compressional-wave energy with sufficient amplitude to give rise to multiple reflections that may interfere with or obscure the desired primary reflections from deeper interfaces such as 14 and 15. For the purpose of obtaining data to be utilized in this invention, a hole 19 is drilled from the surface 10 to a depth below interface 13 sufficient to permit placing a directional detector 20 of compressional seismic waves below the interface 13. While the detector 20 may comprise a single unit that is itself sensitive to the direction of passage of compressional seismic waves, as shown in Patent 2,846,662 of N. R. Sparks, it preferably comprises a spread of individual transducers 21 spaced vertically apart to form a covnentional vertical spread. The outputs of the individual transducers 21 are conveyed to ground surface 10 by a multiple-conductor cable 22 leading to a junction box 23 from which extend conductors to a multiple-channel amplifier 24 and a conventional multiple-trace magnetic recorder 25 for recording the individual detector outputs in phonographically reproducible form. The showing of eight transducers 21 (designated 21a to 21h, respectively, proceeding from the top down, when reference is made to a specific transducer) is only by way of example, any greater or less number being used, as desired.

For generating seismic waves at a location generally above detector 20 in the vicinity of the ground surface 10, any form of conventional seismic-wave generating means such as a vibrator, weight-dropper, or explosive charge may be used. Shown here as an example is an explosive charge 30 at the bottom of a shallow bore hole 29 extending from ground surface 10 to a point immediately below weathering interface 11. For detonating charge 30, leads 32 extend to it from a blaster 31 at ground surface 10, the instant of detonation of the charge 30 being transmitted from blaster 31 by way of a connection 33 to amplifier 24, for recording along with a timing trace by recorder 25.

In operation, with the equipment positioned as shown, seismic waves are created by detonating the charge 30, and the resulting vertically traveling seismic waves passing the individual transducers 21 of detector 20 in both directions are recorded as separate traces by the magnetic recorder 25, along with a trace showing both the passing of time and the instant of detonation of the charge 30, all in a manner conventional in the seismic recording art. As is suggested by the various ray paths shown radiating from the charge 30, seismic energy travels not only directly from charge 30 downwardly to and past detector array 20, as well as downwardly past the interfaces 14, 15 and deeper interfaces (not shown), but also upwardly from charge 30 to the ground surface 10, as well as upwardly from interfaces 12 and 13. The detector 20 therefore receives, not only the primary reflection energy from interfaces 14 and 15, but in addition multiply reflected energy which has been down-reflected by or has reverberated between any of interfaces 10, 11, 12 and 13 before going down past detector 20, to be then reflected upwardly from the interfaces 14, 15 and deeper interfaces.

Figure 2:
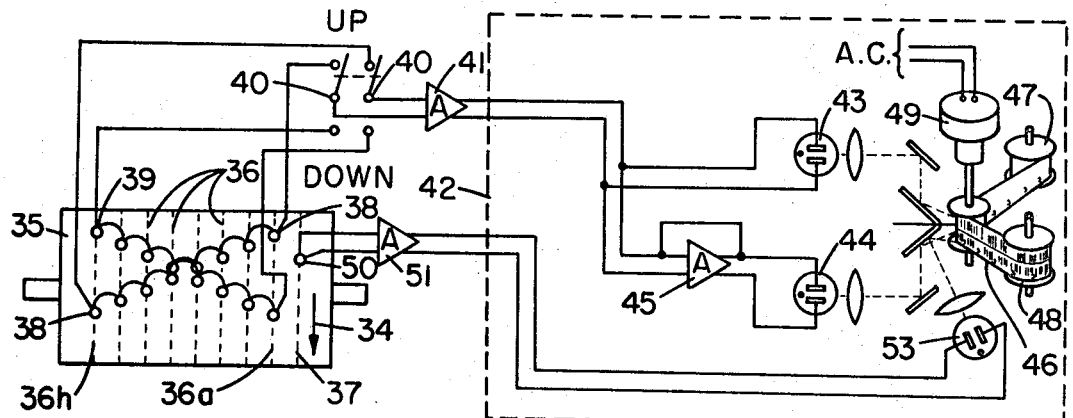
FIGURE 2 is a schematic wiring diagram of apparatus for separating the received waves into up- and down-traveling wave functions.

Referring now to FIGURE 2, this figure shows diagrammatically one embodiment of apparatus for separating the waves received by detector 20 into upgoing and downgoing wave functions. The multiple-trace magnetic record produced by recorder 25 is shown as a playback drum 35 carrying eight traces 36, each corresponding to the waves detected by one of the eight transducers 21 of detector spread 20, and trace 37, which is the timing trace and may include the time break corresponding to the instant of detonation of charge 30. Two arrays of moveable playback heads 38 and 39 are positioned adjacent drum 35 to reproduce the respective traces 36. The heads of array 38 are connected in series and to one terminal pair of a double-pole, double-throw switch 40, while the heads of array 39 are similarly connected in series and to the other fixed terminals of switch 40. The moveable arms of switch 40 are connected to the input of a playback and re-record amplifier 41, the output of which drives the recording elements of a variable-density film recorder 42.

Recorder 42 may include a first modulated glow tube 43 directly connected to the output of amplifier 41 and a second modulated glow tube 44 connected through an inverting amplifier stage 45 to amplifier 41. The oppositely varying illumination provided by glow tubes 43 and 44, in accordance with the two polarities of signal current applied thereto by amplifier 41 is directed by suitable lens and mirror arrangements to a perforated film strip 46 drawn from a supply reel 47 and delivered to a takeup reel 48 by a driving sprocket actuated by a constant speed motor 49. Time-break and timing trace 37 is reproduced by a pickup head 50 through a reproducing and re-record amplifier 51 modulating the light output of a glow tube 53 for recording the time break and timing trace in variable-density form on film 46.

Figure 3:
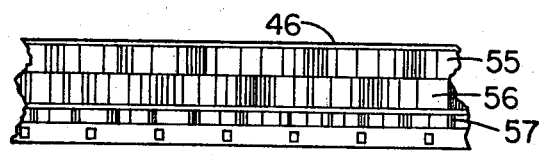
FIGURE 3 shows the appearance of a film recorded by the apparatus of FIGURE 2.

FIGURE 3 shows more clearly the form of recording produced by recorder 42. The output signal from amplifier 41 is recorded as two side-by-side variable-density traces 55 and 56, one being the exact inverse of the other, as determined by inverting amplifier 45. The variable-density trace 57 is that produced by glow tube 53 from the timing signal of trace 37, which is conventionally a constant-frequency sine wave of 100 cycles per second.

In operation, it will be assumed that the surface of drum 35 moves in the direction indicated by arrow 34. The individual heads of array 38 are shifted along the direction of traces 36 in the manner shown in the drawing, so that the relative delay increases according to seismic-wave travel times downwardly along the spread 20. That is, assuming that trace 36a corresponds to the waves received by top detector 21a, while trace 36h corresponds to the waves received by bottom transducer 21h, then the relative delay along the reproducer head array 38, starting from zero for trace 36a, reaches a maximum for trace 36h equal to the seismic-wave travel time between transducers 21a and 21h. In other words, the output of each lower transducer below 21a is delayed by just the time required for seismic waves to travel from it upward to transducer 21a, so that uptraveling seismic events appear to arrive at all transducers 21 simultaneously. During playback, therefore, with switch 40 in its "UP" position, each uptraveling seismic-wave event in the traces 36 is simultaneously reproduced and summed over all the traces by array 38, for transmission to amplifier 41 and thence to recorder 42. Down-traveling waves and all other events having different relative times of arrival at the transducers 21 do not add in phase but tend to cancel or mutually interfere, so that the input to amplifier 41 is predominantly due to the uptraveling seismic waves alone.

Similarly, with the reproducing heads of array 39 set with the opposite relative time delays and with switch 40 in its "DOWN" position, the variable-density traces 55, 56 recorded by recorder 42 correspond to essentially only downgoing seismic waves.

It will be clear that, instead of recording the outputs of transducers 21a–21h as reproducible traces by the recorder 25 and later reproducing the recorded traces as electrical signals with delays followed by summation, the signals while being received from transducers 21a–21h could be immediately passed through two appropriate sets of relative delay means and summed to provide the two directional wave functions. Two variable-density recorders 42, one to record the up-traveling wave function and the other to record the down-traveling wave function, would then produce simultaneously the two film strips required for the convolution step now to be described.

In accordance with this invention, it is the up-traveling wave function obtained with switch 40 in its "UP" position that is to be convolved with the down-traveling wave function obtained with switch 40 in its "DOWN" position. In order that the convolution produce events at essentially only the times of multiple reflections, it is necessary in some manner to modify the directional-wave functions to remove or otherwise omit the first arrivals from source 30 at detector 20, for at least the down-going, and preferably for both the up- and down-going wave functions. This may be done simply by manually placing an opaque coating on traces 55 and 56 of film 46 at the observed times of the first arrivals following each time-break indication on trace 57.

Figure 4:
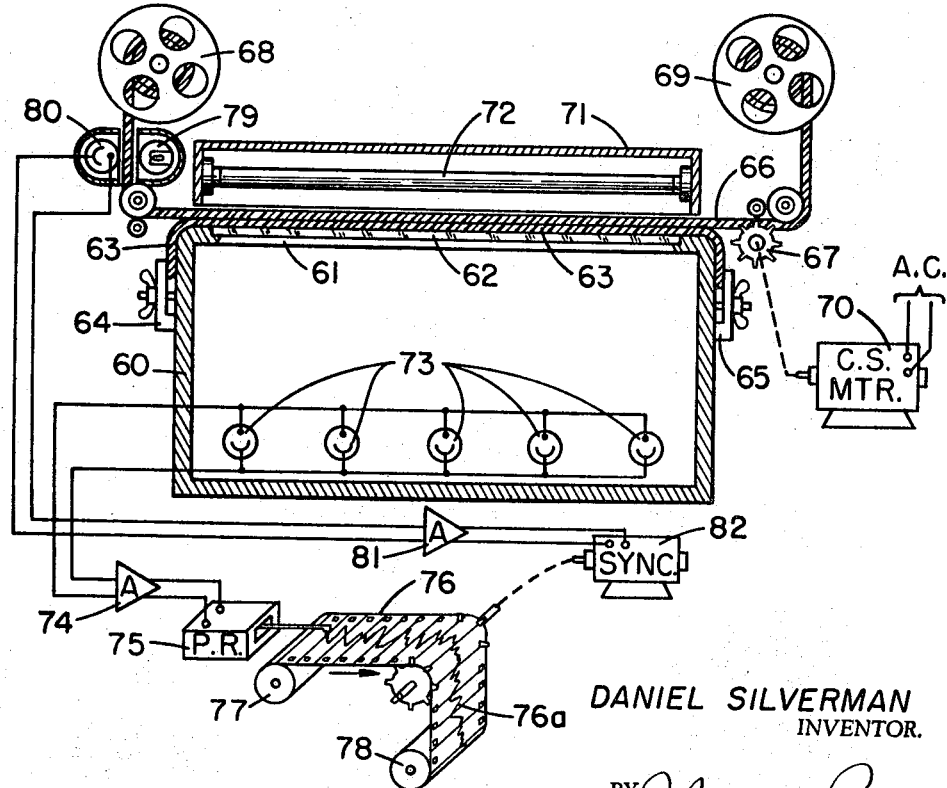
FIGURE 4 shows diagrammatically and partially in cross-section an apparatus for performing convolution operations in accordance with the invention.

In FIGURE 4 is shown diagrammatically and partially in cross-section one form of apparatus for performing this convolution operation, after photographic processing of exposed film 46 and modification to remove first arrivals have been completed. This apparatus comprises an enclosure or box 60 which is light-tight except for an elongated slit 61 covered by a strip of glass 62. The length of slit 61 is sufficient to span the entire duration of one of the two functions to be convolved, as it is recorded on film 46. The width of slit 61 is just equal to the combined widths of traces 55 and 56, and edge-guiding means (not shown) are provided to keep the slit and the two traces 55 and 56 in register throughout their lengths. One strip 63 of film 46, containing one of the functions to be convolved, is placed over slit 61 in contact with glass 62 and is held stationary by clamps 64 and 65. The other film strip 66, bearing the other function to be convolved, and oriented to superimpose one track 55 on the other track 55, is arranged to be moved lengthwise by engagement with a sprocket 67 driven by a constant-speed motor 70, to draw strip 66 from a supply reel 68 to a takeup reel 69. In a housing 71 close to and immediately above the film strips thus in contact, and adapted to pass illumination through both strips and slit 61 into box 60, is an elongated light source 72 such as a fluorescent tube. The interior of enclosure or box 60 is preferably covered with a white or other reflective coating, and on its opposite side facing the slit 61 is an array of photocells 73. These photocells are connected together and to an amplifier 74, the output of which drives a pen recorder 75 marking, on a chart 76 drawn from a supply spool 77 to a takeup spool 78, a trace 76a varying with the total illumination received by the photocells 73. The movement of chart 76 is controlled from timing trace 57, which is scanned by a light source 79 illuminating a photocell 80, as film 66 is drawn from supply spool 68, the timing signal from photocell 80 being amplified, as required, by an amplifier 81 to drive synchronous motor 82 connected to the drive of chart 76.

The manner in which this apparatus performs the function of multiplying and integrating the variable-density traces 55 and 56 of the respective films 63 and 66 is substantially in accordance with the teaching of U.S. Patent 2,839,149 of R. G. Piety. Although Patent 2,839,149 shows superimposing a variable-area and a variable-density film, with the films divided into positive and negative areas having inverse light-transmission characteristics, it will be apparent that two variable-density films superimposed in contact with each other will provide precisely the same multiplication and integration effect as will the variable-area and the variable-density films as shown by Piety. The recorder 42 of FIGURE 2 can alternatively be designed to record in variable-area format, as is well known in the art. Thus, one record can be in variable-density and one in variable-area form, exactly as described by Piety.

Whether the apparatus of FIGURE 4 performs a mathematical correlation or convolution operation depends upon the end-to-end orientation of the films 63 and 66. If the time sequences of the events recorded on both films run in the same direction (for example, from left to right as viewed in FIGURE 4) then movement of the film 66 in either direction performs a correlation operation, with the movement being proportional to delay time. To perform a convolution, as is required in this invention, it is necessary that the events on film 66 (as viewed in FIGURE 4) run in the opposite direction in time sequence from their time sequence of occurrence on film 63, i.e., from right to left. It is preferred that film 66 be moved from left to right past stationary film 63, with zero time for the convolution trace on chart 76 starting when the zero times for the respective traces of films 66 and 63 are in coincidence. It is preferred, also, but not essential, that these zero times be corrected to the ground surface 10 as a reference datum.

In operation, therefore, the convolution trace 76a is plotted in any desired visible form that is convenient for comparison with the up-traveling wave function, preferably plotted with the same form and time scale. Multiple reflections become recognizable by their time coincidence in both compared traces, whereas prominent events that appear in the up-traveling wave trace but not in the convolution trace may with reasonable assurance be interpreted as primary reflections.

Alternatively, or in addition, the discrimination of the multiple reflections may be aided by preparing a visible-trace display as described in my copending joint patent application, Ser. No. 429,427 filed Feb. 1, 1965, now Patent No. 3,344,395, with N. R. Sparks as joint inventor. Briefly, as there described, the two traces visually competed, while in the form of corresponding electrical signals, are subtracted with several different relative amplitudes, and the difference or remainder traces are displayed, preferably in some progressive order of arrangement of the relative amplitudes, as an array of side-by-side visible traces. Multiple reflections are then recognizable by their varying amplitude, which may approach zero (or substantially complete cancellation) or even reverse phase or polarity across the trace array. Primary reflections are strongly emphasized because they do not change amplitude or polarity, but tend to remain of constant amplitude across the array.

Figure 5:
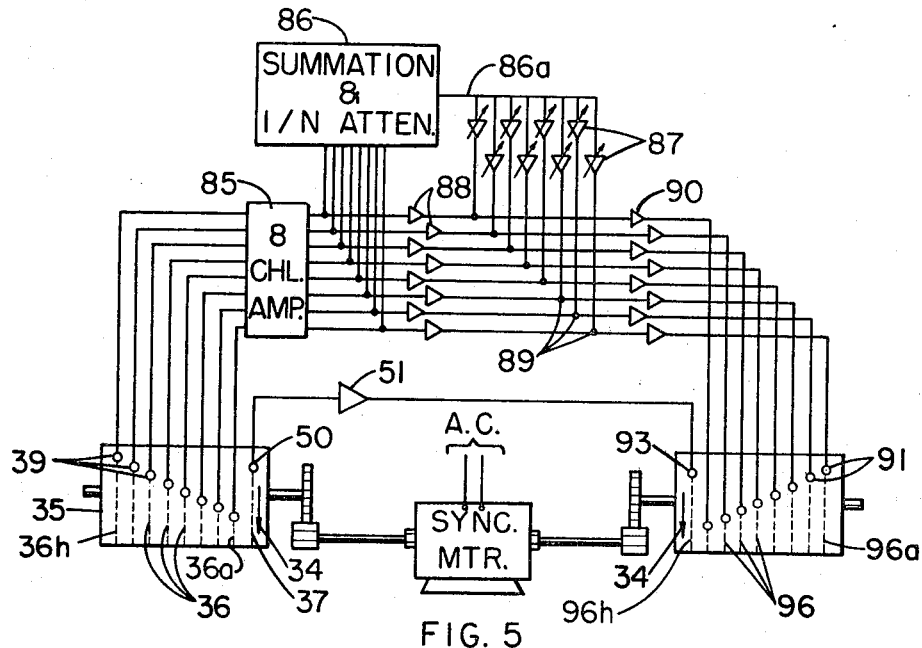
FIGURE 5 is a schematic wiring diagram of a modified form of apparatus for separating the received waves into up- and down-traveling wave functions.

While the separation of the waves received by detector 20 into up- and down-going wave functions is quite effective when performed in the manner illustrated in FIGURE 2, especially when a fairly large number of individual transducers 21 are employed, a still more complete and efficient separation into up- and down-going wave functions may be carried out in accordance with the teachings of U.S. Patent 3,223,967 of C. C. Lash. FIGURE 5 accordingly shows what is frequently a preferred embodiment of this invention, wherein the principles of the above-mentioned patent, and particularly in FIGURE 6 of the patent, are utilized. Briefly stated, to determine the form of the up-going waves for each of the individual transducers 21 of spread 20, the form of the down-going waves is determined utilizing the entire spread as a unit, and this down-going wave function, with the proper relative amplitude, is then subtracted from the total wave function received by each individual transducer 21, to provide a resultant remainder trace which consists of essentially only up-traveling seismic energy for that transducer. Conversely, the down-going seismic waves for each transducer 21 are derived by subtracting an up-traveling wave function, determined using the entire spread 20, from the total waves recorded by each individual transducer, to leave the down-going energy as a remainder trace.

This is more clearly shown by FIGURE 5 where the individual playback heads 39, relatively time-delayed to place down-going events in the traces 36 in time coincidence, have their outputs separately amplified by amplifiers 85 to produce eight separate signals rather than one single output signal. Suitable connections from the respective outputs of amplifiers 85 go to a summation and attenuation network 86, which produces on an output lead 86a a signal which is the sum of the individual input signals received from amplifiers 85. The output on lead 86a is preferably also attenuated by the factor $1/N$, N in this case being eight, corresponding to the number of transducers 21 and recorded traces 36, so that the down-going events in the individual signals and in the summation are of similar amplitude. By amplifiers 87, adjustable to compensate for any slight inequalities between channels, the attenuated summation signal of lead 86a is applied to junction points 89 of the respective signal-carrying channels, with the polarity of the connection at each point 89 being such as to provide subtraction. Buffer amplifiers 88 in the signal-carrying leads prevent feedback from the junction points 89 to the input leads of the summation and attenuation network 86. The resulting remainder or difference voltage for each signal channel, amplified by a corresponding amplifier 90 is recorded by one of an array of recording heads 91 on a rotating magnetic drum 92, as a corresponding one of traces 96 repsectively representing the up-traveling waves of a particular transducer 21. The time-break and timing signals of trace 37 of drum 35 are transferred by playback amplifier 51 to a recording head 93 adjacent drum 92. Preferably, the recording heads 91 are arranged with the reverse set of relative time delays to that of playback heads 39, so that the seismic events of traces 96, constituting essentially only up-traveling seismic waves, are restored to the relative time relationship with which they were initially recorded by recorder 25.

By shifting playback heads 39 of FIGURE 5 into the relative positions of playback heads 38 in FIGURE 2, so that up-traveling events on the traces 36 are simultaneously reproduced into the amplifiers 85, a second set of difference traces, from which the up-traveling energy has been removed by subtraction leaving essentially only down-traveling energy, is obtained analogous to traces 96. It will be understood that the heads 91 will also be re-positioned adjacent drum 92, so as to compensate the respective delays of heads 39 (shifted into the position of heads 38) and restore the seismic events in traces 96 to their original time relationship. In this way, assuming for example eight transducer positions 21, eight traces 96 of up-going seismic waves and eight other traces (not shown), of down-going seismic waves are obtained. Each of the sixteen resulting traces is then converted to a corresponding variable-density trace on film, by applying it along with the timing-trace signals, sequentially to the variable-density recorder 42 of FIGURE 2.

In this embodiment, the convolution step of the invention accordingly involves, for each depth position of a transducer 21, selecting the corresponding up- and down-going film-strip wave functions, blanking out the direct-wave arrival on at least one of the film strips, preferably that of the down-going waves, and then convolving the two film strips in the manner shown in FIGURE 4. Upon repeating this convolution procedure for each of the eight pairs of directional wave functions, eight convolution functions are obtained, for comparison as visible traces with the corresponding up-going wave functions to detect which of the events in the latter are multiple reflections by their time coincidence in the compared traces. Alternatively, as was stated above, each convolution function may be subtracted from the corresponding up-traveling wave function with a plurality of different relative amplitudes, at least one of which will be found to produce substantial cancellation of the multiple reflections in the up-traveling wave function.

Figure 6:
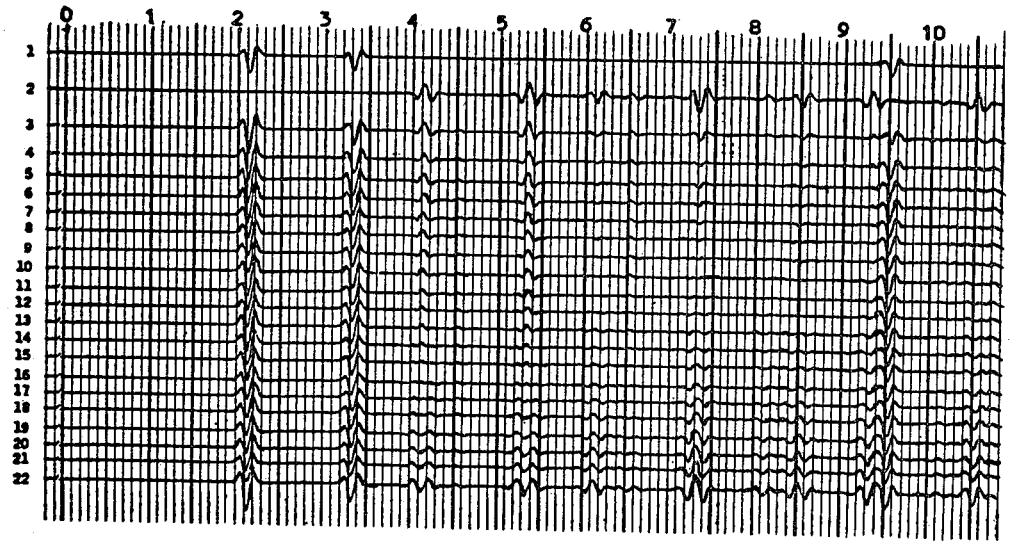
FIGURE 6 is a reproduction of a portion of a record showing results obtained according to the invention, utilizing an assumed example.

In FIGURE 6 is shown an example of the latter type of display, as it is provided by this invention. Trace 1 of this figure is an assumed noise-free trace showing three primary reflections from three interfaces. Trace 2 is a convolution trace analogous to that provided in the present invention, except that it is produced by convolving trace 1 with itself rather than by use of two different traces respectively corresponding to up- and down-going waves. Trace 3 is a computed trace showing all of the reflections, both primary and multiple, to be expected from the layering that produces the primary reflections of trace 1. According to one method of utilizing this invention, a simple visual comparison of traces 2 and 3 identifies which are the multiple reflections in trace 3 simply by the fact of their time coincidence in trace 2. According to an alternate way of utilizing the invention, traces 4 through 22, inclusive, are the difference traces obtained by subtracting trace 2 from trace 3 with a large number of different relative amplitudes of trace 2. As is apparent from inspection of these traces, the primary-reflection events preserve both their character and amplitude across the entire trace array, whereas the multiple reflections, corresponding to the events on trace 2, vary in amplitude, becoming substantially zero and then reversing in phase across the trace display. Although complete cancellation of the multiple reflections occurs on different traces of the display for different multiple reflections, their variation in amplitude in the remainder waves across the display is itself an indication of the nature of these events as multiple reflections rather than primaries, for which the amplitude remains substantially constant.

While my invention has been described with reference to the foregoing specific embodiments and illustrations, it will be apparent to those skilled in the art that the principles of the invention can be employed to accomplish its objects in many further and different ways not disclosed in detail. The scope of the invention, therefore, should not be considered as limited to the embodiments and details described, but it is preferably to be ascertained from the scope of the appended claims.

I claim:
1. The method of discriminating primary and multiple seismic reflections in seismic geophysical surveying which comprises the steps of
creating seismic waves in the earth at a given location,
detecting the resultant seismic waves that travel vertically past a seismic-wave receiver positioned in the earth generally below said given location and also below a plurality of down-reflecting interfaces,
separating said detected vertically traveling waves into two component functions respectively representing the up-traveling and the down-traveling waves passing said receiver,
modifying at least one of said functions to omit or remove that portion corresponding to the waves traveling directly from said given location to said receiver,
convolving said modified functions to produce a convolution function having events at times of multiple seismic reflections, and
utilizing said convolution function to discriminate said multiple reflections in a seismic visible-trace display.
2. The method of claim 1 in which said detecting step comprises positioning a vertical spread consisting of a plurality of spaced seismic-wave transducers in a borehole in the earth below said given location, and separately detecting the resultant seismic waves passing each of said transducers.
3. The method of claim 2 in which said separating step comprises summing said separately detected resultant waves with first relative time delays to place up-traveling events passing said transducers in time coincidence, to obtain said up-traveling wave function, and summing said separately detected seismic waves with second relative time delays to place down-traveling events passing said transducers in time coincidence to obtain said down-traveling wave function.

4. The method of claim 2 in which said detecting step comprises separately recording the resultant seismic waves passing each of said transducers as a corresponding one of a plurality of phonographically reproducible traces.

5. The method of claim 4 in which said separating step comprises reproducing said traces with first relative time delays to place up-traveling events in said traces in time coincidence, and summing said first time-delayed reproduced traces to obtain said up-traveling wave function, and reproducing said traces with second relative time delays to place down-traveling events in said traces in time coincidence, and assuming second time-delayed reproduced traces to obtain said down-traveling wave function.

6. The method of claim 5 including the further step of subtracting said up-traveling wave function, as obtained in accordance with claim 5, from each of said first time-delayed traces with up-traveling waves in time coincidence and with a relative amplitude to produce substantially complete of up-traveling waves in each of said traces and to leave essentially only down-traveling waves therein, and also including the further step of subtracting said down-traveling wave function from each of said second time-delayed traces with down-traveling waves in time coincidence and with a relative amplitude to produce substantially complete cancellation of down-traveling waves and leave essentially only up-traveling waves in said traces, whereby a first and a second plurality of traces are obtained respectively representing the down-traveling and the up-traveling waves at the depth of each of the detectors of said vertical spread.

7. The method of claim 6 in which said convolution step comprises, for each detector depth in said vertical spread, convolving the corresponding one of said first plurality of traces with the corresponding one of said second plurality of traces to produce a corresponding plurality of convolution functions.

8. The method of claim 7 in which said utilizing step comprises, for each of said vertical-spread detectors, visibly displaying for comparison the corresponding up-traveling wave trace and the corresponding one of said convolution functions to identify multiple reflections by their time coincidence in said comparison traces.

9. The method of claim 7 in which said utilizing step comprises subtracting from each of said plurality of up-traveling wave functions the corresponding one of said convolution functions with a plurality of different relative amplitudes, at least one of which relative amplitudes is such as to produce a substantial cancellation of multiple reflections due to their time coincidence in said subtracted functions.

10. The method of claim 1 in which said utilizing step comprises producing a seismic visible-trace display wherein said multiple reflections are discriminated by their time coincidence in said convolution and said up-traveling wave functions.

11. The method of claim 10 in which said utilizing step comprises visibly displaying for comparison two traces respectively corresponding to said up-traveling wave function and to said convolution function, to identify multiple reflections by their time coincidence in said two comparison traces.

12. The method of claim 10 in which said utilizing step comprises subtracting said up-traveling wave function and said convolution function with a plurality of different relative amplitudes, at least one of which relative amplitudes is such as to produce a substantial cancellation of multiple reflections due to their time coincidence in said subtracted functions, and visibly displaying a plurality of remainder traces each corresponding to one of said relative subtraction amplitudes, whereby primary reflections can be identified by their substantially constant amplitude in said plurality of remainder traces.

References Cited

UNITED STATES PATENTS

| | | | |
|---|---|---|---|
| 1,923,107 | 8/1933 | McCollum | 181—.5 |
| 2,740,945 | 4/1956 | Howes | 181—.5 X |
| 2,792,067 | 5/1957 | Peterson | 181—.5 |
| 2,842,220 | 7/1958 | Clifford et al. | 181—.5 |
| 3,223,967 | 12/1965 | Lash | 340—15.5 |
| 3,278,893 | 10/1966 | Silverman | 181—.5 X |
| 3,339,176 | 8/1967 | Sparks | 340—15.5 |

BENJAMIN A. BORCHELT, *Primary Examiner.*

R. M. SKOLNIK, *Assistant Examiner.*

UNITED STATES PATENT OFFICE
CERTIFICATE OF CORRECTION

Patent No. 3,371,310                           February 27, 1968

Daniel Silverman

It is hereby certified that error appears in the above numbered patent requiring correction and that the said Letters Patent should read as corrected below.

Column 7, line 33, for "repsectively" read -- respectively" --; column 9, line 18, for "assuming" read -- summing said --; line 26, for "complete" read -- complete cancellation --.

Signed and sealed this 6th day of May 1969.

(SEAL)
Attest:

Edward M. Fletcher, Jr.
Attesting Officer

Commissioner of Patents